(12) United States Patent
    Chuang

(10) Patent No.: US 12,475,063 B2
(45) Date of Patent: Nov. 18, 2025

(54) DATA TRANSMISSION DEVICE WITH FIFO CIRCUITS FOR READING AND WRITING OPERATIONS AND METHOD

(71) Applicant: Nuvoton Technology Corporation, Hsinchu Science Park (TW)

(72) Inventor: Chih-Chieh Chuang, Kaohsiung (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 44 days.

(21) Appl. No.: 18/504,582

(22) Filed: Nov. 8, 2023

(65) Prior Publication Data
    US 2024/0168894 A1    May 23, 2024

(30) Foreign Application Priority Data
    Nov. 18, 2022    (TW) .................................. 111144114

(51) Int. Cl.
    *G06F 13/16*    (2006.01)
(52) U.S. Cl.
    CPC ...... *G06F 13/1642* (2013.01); *G06F 13/1673* (2013.01)
(58) Field of Classification Search
    CPC .................................................. G06F 13/1642
    USPC ....................................................... 710/110
    See application file for complete search history.

(56) References Cited

U.S. PATENT DOCUMENTS

| | | | |
|---|---|---|---|
| 10,198,382 B2 | 2/2019 | Danis et al. | |
| 2007/0067549 A1* | 3/2007 | Gehman | G06F 13/4031 710/315 |
| 2007/0115995 A1* | 5/2007 | Kim | H04L 47/50 370/392 |
| 2012/0159088 A1* | 6/2012 | Balkan | G06F 13/1668 711/147 |
| 2013/0046909 A1* | 2/2013 | Huang | G06F 13/4022 710/110 |
| 2014/0189187 A1* | 7/2014 | Acharya | G06F 13/385 710/310 |
| 2014/0310443 A1* | 10/2014 | Herbeck | G06F 13/28 710/308 |

(Continued)

FOREIGN PATENT DOCUMENTS

| | | |
|---|---|---|
| CN | 104424147 B | 9/2017 |
| TW | I276964 B | 3/2007 |
| TW | 201638771 A | 11/2016 |

*Primary Examiner* — Titus Wong
(74) *Attorney, Agent, or Firm* — MUNCY, GEISSLER, OLDS & LOWE, P.C.

(57) ABSTRACT

An embodiment of the invention provides a data transmission device. The data transmission device includes a first bus master control circuit, a second bus master control circuit, a storage circuit, a first control circuit and a second control circuit. The first bus master control circuit processes data transmissions associated with a peripheral device. The second bus master control circuit processes data transmissions associated with a system memory. The storage circuit stores information and instructions for data transmission. The first control circuit controls the first bus master control circuit according to the information and the instructions. The second control circuit controls the second bus master control circuit according to the information and the instructions.

18 Claims, 3 Drawing Sheets

(56) References Cited

U.S. PATENT DOCUMENTS

| | | | |
|---|---|---|---|
| 2015/0236870 A1* | 8/2015 | Lee | G06F 13/4068 |
| | | | 370/257 |
| 2016/0124878 A1* | 5/2016 | Pean | G06F 13/28 |
| | | | 710/308 |
| 2016/0224490 A1 | 8/2016 | Danis et al. | |
| 2017/0052910 A1* | 2/2017 | Lee | G06F 13/1689 |
| 2017/0256016 A1* | 9/2017 | Lee | G06T 1/60 |
| 2018/0336147 A1* | 11/2018 | Lee | G06F 15/7817 |

* cited by examiner from peripheral device to system memory

| read from peripheral device | read from peripheral device | write into system memory |
| --- | --- | --- |
| | write into system memory | |

FIG. 2A from system memory to peripheral device

| read from system memory | read from system memory | write into peripheral device |
| --- | --- | --- |
| | write into peripheral device | |

FIG. 2B

DATA TRANSMISSION DEVICE WITH FIFO CIRCUITS FOR READING AND WRITING OPERATIONS AND METHOD

CROSS REFERENCE TO RELATED APPLICATIONS

This application claims priority of TW Patent Application No. 111144114 filed on Nov. 18, 2022, the entirety of which is incorporated by reference herein.

BACKGROUND OF THE INVENTION

Field of the Invention

The invention generally relates to data transmission technology, and more particularly, to a data transmission technology in which a direct memory access (DMA) device is used to process the read operations and write operations between peripheral devices and system memory at the same time.

Description of the Related Art

Peripheral direct memory access (PDMA) technology is widely used with System on a Chip (SOC) to reduce the loading of central processing unit (CPU) when the CPU processes the data transmission between the peripheral devices and system memory.

In traditional PDMA technology, when data needs to be transmitted to the system memory from the peripheral device, the PDMA controller may read data from the peripheral device via the bus master control circuit, and it may store the data in the buffer of the PDMA controller. Then, the PDMA controller may write the data into the system memory via the bus master control circuit. On the other hand, in traditional PDMA technology, when data needs to be transmitted to the peripheral device from the system memory, the PDMA controller may read data from the system memory via the bus master control circuit, and stores the data in the buffer of the PDMA controller. Then, the PDMA controller may write the data into the peripheral device via the bus master control circuit. That is to say, in traditional PDMA technology, the bus master control circuit of the PDMA controller may perform a write operation after the read operation.

However, how to make the PDMA controller process data transmissions more efficiently and increase the data transmission time are worthy of discussion.

BRIEF SUMMARY OF THE INVENTION

A data transmission device and method are provided to overcome the problems mentioned above. A first bus master control circuit and a second bus master control circuit are allocated in the data transmission device to perform read operations and write operations at the same time to increase the data-transmission speed.

An embodiment of the invention provides a data transmission device. The data transmission device includes a first bus master control circuit, a second bus master control circuit, a storage circuit, a first control circuit, and a second control circuit. The first bus master control circuit is coupled to the first buffer and processes data transmissions associated with a peripheral device. The second bus master control circuit is coupled to a second buffer and processes data transmissions associated with a system memory. The storage circuit stores information and instructions for data transmission. The first control circuit is coupled to the first bus master control circuit and the storage circuit, and controls the first bus master control circuit according to the information and the instructions. The second control circuit is coupled to the second bus master control circuit and the storage circuit, and controls the second bus master control circuit according to the information and the instructions.

According to an embodiment of the invention, the data transmission device may further comprise a first first-in, first-out (FIFO) circuit, a second FIFO circuit and a FIFO control circuit. The first FIFO circuit is coupled to the first bus master control circuit and the second bus master control circuit and performs a first data buffering from the first bus master control circuit to the second bus master control circuit. The second FIFO circuit is coupled to the first bus master control circuit and the second bus master control circuit and performs a second data buffering from the second bus master control circuit to the first bus master control circuit. The FIFO control circuit is coupled to the first control circuit, the second control circuit, the first FIFO circuit and the second FIFO circuit, and configured to control the first FIFO circuit and the second FIFO circuit.

According to an embodiment of the invention, when data needs to be transmitted from the peripheral device to the system memory, the first bus master control circuit may read the data from the peripheral device, and the second bus master control circuit may write the data into the system memory. In addition, based on the information and instructions for data transmission from the storage circuit, the first control circuit may indicate the first bus master control circuit to read the data from the peripheral device through the first bus, and based on the information and instructions for data transmission from the storage circuit, the second control circuit may indicate the second bus master control circuit to write the data into the system memory through the second bus.

According to the embodiments of the invention, in the data transmission method, when data needs to be transmitted from the system memory to the peripheral device, the second bus master control circuit may read the data from the system memory, and the first bus master control circuit may write the data into the peripheral device. In addition, based on the information and instructions for data transmission from the storage circuit, the second control circuit may indicate the second bus master control circuit to read the data from the system memory through the second bus, and based on the information and instructions for data transmission from the storage circuit, the first control circuit may indicate the first bus master control circuit to write the data into the peripheral device through the first bus.

An embodiment of the invention provides a data transmission method. The data transmission method is applied to a data transmission device. The data transmission method comprises the following steps: using a first control circuit of the data transmission device to control a first bus master control circuit of the data transmission device to perform data transmission associated with a peripheral device according to stored information and instructions: and using a second control circuit of the data transmission device to control a second bus master control circuit of the data transmission device to perform data transmission associated with a system memory according to the stored information and instructions.

Other aspects and features of the invention will become apparent to those with ordinary skill in the art upon review of the following descriptions of specific embodiments of a data transmission device and method.

BRIEF DESCRIPTION OF THE DRAWINGS

The invention will become more fully understood by referring to the following detailed description with reference to the accompanying drawings, wherein:

FIG. 2A is a schematic diagram illustrating read operation and write operation according to an embodiment of the invention;

FIG. 2B is a schematic diagram illustrating read operation and write operation according to another embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
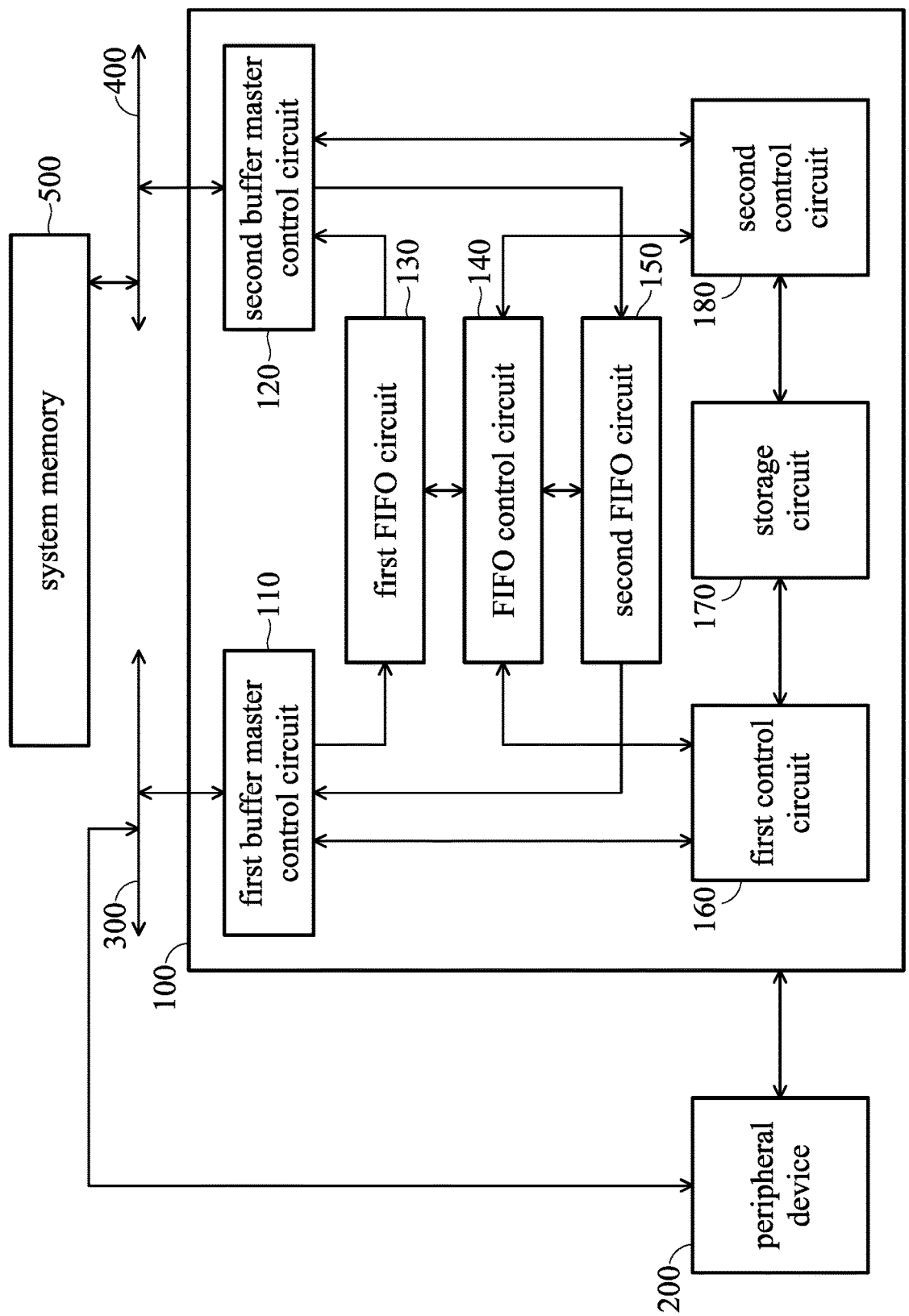
FIG. 1 is a block diagram of a data transmission device 100 according to an embodiment of the invention.

FIG. 1 is a block diagram of a data transmission device 100 according to an embodiment of the invention. As shown in FIG. 1, the data transmission device 100 may at least comprise a first buffer master control circuit 110, a second buffer master control circuit 120, a first first-in, first-out (FIFO) circuit 130, a FIFO controller 140, a second FIFO circuit 150, a first control circuit 160, a storage circuit 170 and a second control circuit 180. It should be noted that FIG. 1 presents a simplified block diagram in which only the elements relevant to the invention are shown. However, the invention should not be limited to what is shown in FIG. 1. The data transmission device 100 may also comprise other elements.

According to the embodiments of the invention, the data transmission device 100 may be a Direct Memory Access (DMA) controller or a Peripheral DMA (PDMA) controller. In addition, the data transmission device 100 may be applied to System on a Chip (SOC) and Microcontroller Unit (MCU), but the invention should not be limited thereto.

As shown in FIG. 1, the first bus master control circuit 110 may be coupled to a first bus 300 and the second bus master control circuit 120 may be coupled to a second bus 400. According to an embodiment of the invention, the first bus 300 may be an Advanced High-performance Bus (AHB) or an Advanced Extensible Interface (AXI). That is to say, the first bus master control circuit 110 may be an AHB master control circuit or an AXI master control circuit. According to an embodiment of the invention, the second bus may also be an AHB or an AXI. That is to say, the second bus master control circuit 120 may be an AHB master control circuit or an AXI master control circuit.

According to an embodiment of the invention, the first bus master control circuit 110 is configured to process the data transmission between the data transmission device 100 and the peripheral device 200. The second bus master control circuit 120 is configured to process the data transmission between the data transmission device 100 and the system memory 500. In addition, specifically, there is only one peripheral device shown in FIG. 1, but the invention should not be limited thereto. The data transmission device 100 also may be coupled to a plurality of peripheral devices 200. When data needs to be transmitted from the peripheral devices 200 to the system memory 500, the first bus master control circuit 110 may read the data from the peripheral device 200 and the second bus master control circuit 120 may write the data into the system memory 500. When data needs to be transmitted from the system memory 500 to the peripheral devices 200, the second bus master control circuit 120 may read the data from the system memory 500 and the first bus master control circuit 110 may write the data into the peripheral device 200.

According to an embodiment of the invention, the FIFO control circuit 140 may be configured to control the first FIFO circuit 130 and the second FIFO circuit 150. In addition, the first FIFO 130 may be configured to perform the data buffer from the first bus master control circuit 110 to the second bus master control circuit 120. That is to say, the first FIFO circuit 130 may store the data transmitted from the peripheral devices 200 to the system memory 500. The second FIFO 150 may be configured to perform the data buffer from the second bus master control circuit 120 to the first bus master control circuit 110. That is to say, the second FIFO circuit 150 may store the data transmitted from the system memory 500 to the peripheral devices 200.

According to an embodiment of the invention the storage circuit 170 may store the information (e.g., a transfer descriptor table) and instructions of the data transmission. The central processing unit (CPU) may store the data transmission information and instructions in the storage circuit 170 through a bus slave control circuit (not shown in figures) of the data transmission device 100.

According to an embodiment of the invention, the first control circuit 160 may be a peripheral device finite state machine (FSM) circuit, and the second control circuit 180 may be a system memory FSM circuit. The first control circuit 160 and the second control circuit 180 may obtain the information and instructions for data transmission from the storage device 170. The first control circuit 160 may control the first buffer master control circuit 110 and the FIFO control circuit 140 based on the information and instructions for data transmission from the storage device 170. The second control circuit 180 may control the second buffer master control circuit 120 and the FIFO control circuit 140. Details may be illustrated below.

According to an embodiment of the invention, when the data needs to be transmitted from the peripheral devices 200 to the system memory 500, based on the information and instructions for data transmission from the storage device 170, the first control circuit 160 may indicate the first bus master control circuit 110 to read the data from the peripheral devices 200 through the first bus 300 and transmit the data to the first FIFO circuit 130. Then, based on the information and instructions for data transmission from the storage device 170, the second control circuit 180 may indicate the second bus master control circuit 120 to obtain data from the first FIFO circuit 130 and write the data to system memory 500 through the second bus 400. In addition, in the embodiment, based on the information and instructions for data transmission from the storage device 170, the first control circuit 160 and the second control circuit 180 may indicate the FIFO control circuit 140 to control the first FIFO circuit 130 to perform the data buffer operations. The first control circuit 160 and the second control circuit 180 may also know the current storage state of the first FIFO circuit 130 from the FIFO control circuit 140. As illustrations above, in the embodiment, the read operations of peripheral devices 200 and the write operations of the system memory 500 may be operated at the same time (as shown in FIG. 2A). Therefore, the data transmission may be more efficient and fast. It should be noted that FIG. 2A is only used to illustrate the embodiment of the invention, but the invention should not be limited thereto.

Figure 3:
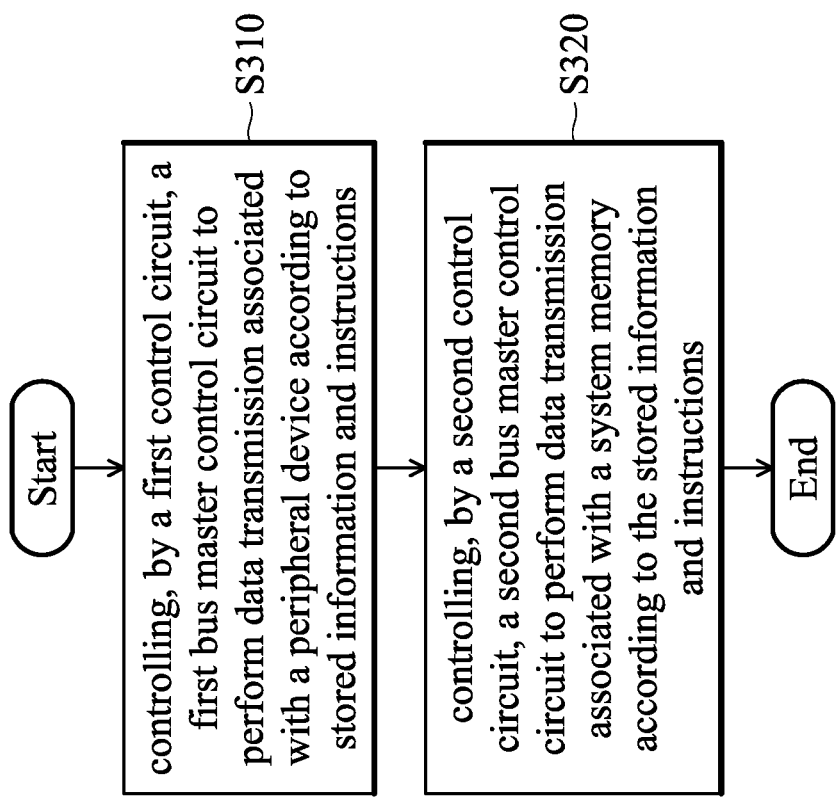
FIG. 3 is a flow chart illustrating a data transmission method according to an embodiment of the invention.

According to an embodiment of the invention, when the data needs to be transmitted from the system memory 500 to the peripheral devices 200, based on the information and instructions for data transmission from the storage device 170, the second control circuit 180 may indicate the second bus master control circuit 120 to read data from the system memory 500 through second bus 400 and transmit the second FIFO circuit 150. Then, based on the information and instructions for data transmission from the storage device 170, the first control circuit 160 may indicate the first bus master control circuit 110 to obtain data from the second FIFO circuit 150 and write the data into peripheral devices 200 through the first bus 300. In addition, in the embodiment, based on the information and instructions for data transmission from the storage device 170, the first control circuit 160 and the second control circuit 180 may indicate the FIFO control circuit 140 to control the second FIFO circuit 150 to perform the data buffer operations. The first control circuit 160 and the second control circuit 180 may also know the current storage state of the second FIFO circuit 150 from the FIFO control circuit 140. As illustrations above, in the embodiment, the read operations of the system memory 500 and the write operations of the peripheral devices 200 may be operated at the same time (as shown in FIG. 2B). Therefore, the data transmission may be more efficient and fast. It should be noted that FIG. 2B is only used to illustrate the embodiment of the invention, but the invention should not be limited thereto FIG. 3 is a flow chart illustrating a data transmission method according to an embodiment of the invention. The data transmission method can be applied to the data transmission device 100. As shown in FIG. 3, in step S310, based on the information and instructions for the data transmission, a first control circuit of the data transmission device 100 may control a first bus master control circuit of the data transmission device 100 to perform the data transmission associated with peripheral devices.

In step S320, based on the information and instructions for the data transmission, a second control circuit of the data transmission device 100 may control a second bus master control circuit of the data transmission device 100 to perform the data transmission associated with a system memory.

According to the embodiments of the invention, in the data transmission method, a first FIFO circuit of the data transmission device 100 may perform a first data buffering from the first bus master control circuit to the second bus master control circuit, and a second FIFO circuit of the data transmission device 100 may perform a second data buffering from the second bus master control circuit to the first bus master control circuit. When data needs to be transmitted from the peripheral device to the system memory, the first FIFO may be configured to store the first data, and when data needs to be transmitted from the system memory to the peripheral device, the second FIFO may be configured to store the second data. According to the embodiments of the invention, in the data transmission method, based on the information and instructions for data transmission, the first control circuit and the second control circuit of data transmission device 100 may control the FIFO control circuit of the data transmission device 100.

According to the embodiments of the invention, in the data transmission method, the first bus master control circuit of the data transmission device 100 may be an Advanced High-performance Bus (AHB) master control circuit or an Advanced Extensible Interface (AXI) master control circuit, and the first buffer may be an AHB or an AXI. The second bus master control circuit of the data transmission device 100 may be an AHB master control circuit or an AXI master control circuit, and the second buffer may be an AHB or an AXI.

According to the embodiments of the invention, in the data transmission method, when data needs to be transmitted from the peripheral device to the system memory, the first bus master control circuit of the data transmission device 100 may read the data from the peripheral device, and the second bus master control circuit of the data transmission device 100 may write the data into the system memory. In addition, in the data transmission method, based on the information and instructions for data transmission, the first control circuit of the data transmission device 100 may indicate the first bus master control circuit to read the data from the peripheral device through the first bus. Based on the information and instructions for data transmission, the second control circuit of the data transmission device 100 may indicate the second bus master control circuit to write the data into the system memory through the second bus.

According to the embodiments of the invention, in the data transmission method, when data needs to be transmitted from the system memory to the peripheral device, the second bus master control circuit of the data transmission device 100 may read the data from the system memory, and the first bus master control circuit of the data transmission device 100 may write the data into the peripheral device. In addition, in the data transmission method, based on the information and instructions for data transmission, the second control circuit of the data transmission device 100 may indicate the second bus master control circuit to read the data from the system memory through the second bus, and based on the information and instructions for data transmission, the first control circuit of the data transmission device 100 may indicate the first bus master control circuit to write the data into the peripheral device through the first bus.

According to the data transmission method provided in the invention, when data needs to be transmitted from the peripheral device to the system memory, the data transmission device 100 may perform the read operation of the peripheral device and the write operation of the system memory at the same time, and when data needs to be transmitted from the system memory to the peripheral device, the data transmission device 100 may perform the read operation of the system memory and the write operation of the peripheral device at the same time. Therefore, according to the data transmission method provided in the invention, the data transmission for the peripheral direct memory access (PDMA) device may be more efficient and fast.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data transmission device, comprising:
   a first bus master control circuit, coupled to a first bus and processing data transmission between the data transmission device and a peripheral device;
   a second bus master control circuit, coupled to a second bus and processing data transmission between the data transmission device and a system memory;
   a storage circuit, storing information and instructions for data transmission;
   a first control circuit, coupled to the first bus master control circuit and the storage circuit, and controlling the first bus master control circuit according to the information and the instructions; and
   a second control circuit, coupled to the second bus master control circuit and the storage circuit, and controlling the second bus master control circuit according to the information and the instructions,
   wherein the data transmission device further comprises:
   a first first-in, first-out (FIFO) circuit, coupled to the first bus master control circuit and the second bus master control circuit, and performing a first data buffering from the first bus master control circuit to the second bus master control circuit;
   a second FIFO circuit, coupled to the first bus master control circuit and the second bus master control circuit, performing a second data buffering from the second bus master control circuit to the first bus master control circuit; and
   a FIFO control circuit, coupled to the first control circuit, the second control circuit, the first FIFO circuit and the second FIFO circuit, and configured to control the first FIFO circuit and the second FIFO circuit.

2. The data transmission device of claim 1, wherein the first control circuit and the second control circuit control the FIFO control circuit according to the information and the instructions of data transmission stored in the storage circuit.

3. The data transmission device of claim 1, wherein when a first data is transmitted from the peripheral device to the system memory, the first FIFO circuit is configured to store the first data, and when a second data is transmitted from the system memory to the peripheral device, the second FIFO is configured to store the second data.

4. The data transmission device of claim 1, wherein the first bus master control circuit is an Advanced High-performance Bus (AHB) master control circuit or an Advanced Extensible Interface (AXI) master control circuit, and the first bus is an AHB or an AXI.

5. The data transmission device of claim 1, wherein the second bus master control circuit is an AHB master control circuit or an AXI master control circuit, and the second bus is an AHB or an AXI.

6. The data transmission device of claim 1, wherein when a data is transmitted from the peripheral device to the system memory, the first bus master control circuit reads the data from the peripheral device, and the second bus master control circuit writes the data into the system memory.

7. The data transmission device of claim 6, wherein based on the information and the instructions for data transmission obtained from the storage circuit, the first control circuit indicates the first bus master control circuit to read the data from the peripheral device through the first bus, and based on the information and the instructions for data transmission, the second control circuit indicates the second bus master control circuit to write the data into the system memory through the second bus.

8. The data transmission device of claim 1, wherein when a data needs to be is transmitted from the system memory to the peripheral device, the second bus master control circuit reads the data from the system memory, and the first bus master control circuit writes the data into the peripheral device.

9. The data transmission device of claim 8, wherein based on the information and the instructions for data transmission obtained from the storage circuit, the second control circuit indicates the second bus master control circuit to read the data from the system memory through the second bus, and based on the information and the instructions for data transmission obtained from the storage circuit, the first control circuit indicates the first bus master control circuit to write the data to the peripheral device through the first bus.

10. A data transmission method, applied to a data transmission device, comprising:
    controlling, by a first control circuit of the data transmission device, a first bus master control circuit of the data transmission device to perform data transmission between the data transmission device and a peripheral device according to information and instructions for data transmission stored in a storage circuit of the data transmission device; and
    controlling, by a second control circuit of the data transmission device, a second bus master control circuit of the data transmission device to perform data transmission between the data transmission device and a system memory according to the information and the instructions,
    wherein the method further comprises:
    performing, by a first first-in, first-out (FIFO) circuit of the data transmission device, a first data buffering from the first bus master control circuit to the second bus master control circuit; and performing, by a second FIFO circuit of the data transmission device, a second data buffering from the second bus master control circuit to the first bus master control circuit.

11. The data transmission method of claim 10, further comprising:
controlling, by the first control circuit and the second control circuit, a FIFO control circuit according to the information and the instructions of data transmission.

12. The data transmission method of claim 10, further comprising:
when a first is transmitted from the peripheral device to the system memory, configuring the first FIFO circuit to store the first data, and when a second data is transmitted from the system memory to the peripheral device, configuring the second FIFO to store the second data.

13. The data transmission method of claim 10, wherein the first bus master control circuit is an Advanced High-performance Bus (AHB) master control circuit or an Advanced Extensible Interface (AXI) master control circuit, and a first bus coupled to the first bus master control circuit is an AHB or an AXI.

14. The data transmission method of claim 10, wherein the second bus master control circuit is an AHB master control circuit or an AXI master control circuit, and a second bus coupled to the second bus master control circuit is an AHB or an AXI.

15. The data transmission method of claim 10, further comprising:
when a data is transmitted from the peripheral device to the system memory, reading, by the first bus master control circuit, the data from the peripheral device; and
writing, by the second bus master control circuit, the data into the system memory.

16. The data transmission method of claim 15, further comprising:
based on the stored information and instructions for data transmission, indicating, by the first control circuit, the first bus master control circuit to read the data from the peripheral device through a first bus; and
based on the stored information and instructions for data transmission, indicating, by the second control circuit, the second bus master control circuit to write the data into the system memory through a second bus.

17. The data transmission method of claim 10, further comprising:
when a data is transmitted from the system memory to the peripheral device, reading, by the second bus master control circuit, the data from the system memory; and
writing, by the first bus master control circuit, the data into the peripheral device.

18. The data transmission method of claim 17, further comprising:
based on the stored information and instructions, indicating, by the second control circuit, the second bus master control circuit to read the data from the system memory through a second bus; and
based on the stored information and instructions, indicating, by the first control circuit, the first bus master control circuit to write the data to the peripheral device through a first bus.

* * * * *